United States Patent Office 3,474,051
Patented Oct. 21, 1969

3,474,051
POLYMER FOAMS REINFORCED WITH
CRYSTALLINE POLYOLEFINS
David C. Chappelear, Thomas J. Stolki, Seymour Newman, and Quirino A. Trementozzi, Springfield, Mass., assignors to Monsanto Company, St. Louis, Mo., a corporation of Delaware
No Drawing. Filed Jan. 3, 1966, Ser. No. 518,008
Int. Cl. C08f 47/08, 29/12; C08j 1/18
U.S. Cl. 260—2.5                                            12 Claims

ABSTRACT OF THE DISCLOSURE

The invention relates to a foamed thermoplastic resin reinforced with crystalline polyolefin fibers; wherein the fibrous phase is substantially tougher and stronger than the foamed phase.

---

This invention relates to novel foamed thermoplastic resins. More particularly it relates to novel foamed thermoplastic resins which are reinforced with a second component which is fibrous.

During recent years the foaming of thermoplastic resins has grown in commercial importance. Foamed thermoplastic resins find wide and practical use in such varied applications as thermal and acoustical insulation, shockproof shipping containers, ice buckets, beverage coolers, cups, toys, hospital pads, boating equipment, padded dashboards, visors in vehicles, cores for sandwich structures, etc.

In spite of the large growth and wide acceptance, foamed thermoplastic resins still have major shortcomings, such as poor tensile and tear strength which seriously limits their use.

An object of this invention is to provide foamed thermoplastic resins with a greater tear and tensile strength.

Another object of this invention is to provide a method for producing foamed thermoplastic resins with a greater tear and tensile strength.

These and other objects are attained by producing a foamed thermoplastic resin reinforced with fibers, wherein the fibrous component is selected from the group consisting of crystalline polyolefins; wherein the fibrous phase has a substantially greater toughness than the foamed phase.

The following examples are given in illustration of the invention and are not intended as limitations thereof. All parts and percentages are by weight unless otherwise specified.

EXAMPLE I

This example deals with unreinforced polystyrene foam and is set forth as a control to illustrate the better physical properties that are achieved with the reinforced foams of this invention.

The following charge is placed in a covered, jacketed ribbon blender:

100 parts of 20 mesh granular styrene with a Staudinger molecular weight of about 55,000
3 parts of colloidal silica The atmospheric oxygen is purged from the blender with nitrogen to a level of less than 6% oxygen. The styrene-silica mixture is then sprayed with 10 parts of a 95:5 pentane/acetone solution and blended for 30 minutes.

The above mixture is fed into a 2½ inch extruder which is maintained at the following conditions:

|  | ° F. |
|---|---|
| Hopper | 80 |
| Feed zone | 80–90 |
| Middle zone | 250 |
| Die zone | 300 |
| Sheet die | 300 | with a 22 L/D screw speed at 36 r.p.m. Foam is extruded through a sheet die at a rate of 100 lbs./hr. and a stock temperature of 290° F. The foam obtained has a thickness of about 0.1 inch and a density of from 2 to 4 lbs./cu. ft.

EXAMPLE II

This example illustrates the use of preformed fibers i.e., formable pellets which already contain an oriented fibrous phase, in the preparation of a reinforced foam. These preformed fiber pellets are prepared as follows:

90 parts of polystyrene homopolymer (in the form of ¼ inch pellets) having a Staudinger molecular weight of about 55,000 are blended with 10 parts of granular highly crystalline poly(4 - methyl - 1 - pentene) having a melting point of about 235° C. (455° F.). This mixture is fed to a 2½ inch vented extruder operating under the following temperature conditions:

|  | ° F. |
|---|---|
| Hopper | 60–100 |
| Feed zone | 300 |
| Middle zone | 550 |
| Die zone | 550 |

The polymer mixture is extruded as a composite monofilament about ⅛" in diameter, not drawn over a heated shoe, cooled and chopped into ¼" preformed pellets.

100 parts of these preformed fiber pellets are then tumbled with 3 parts colloidal silica and 10 parts of a 95:5 pentane/acetone solution for 14 days at 25–30° C. and foamed through a slit die on a 2½ inch extruder according to procedure in Example I.

The poly(4-methyl-1-pentene) fibers which are dispersed throughout the styrene pellets do not absorb the pentane/acetone solution and consequently do not foam. These fibers have a length/diameter (L/D) ratio of greater than 20 and are randomly dispersed giving greater tear and tensile strength to the foam. The result is a reinforced foam having a thickness of about 0.1 inch and a density of from 2 to 4 lbs./cu. ft., which is found to be significantly stronger than the unreinforced foam of Example I, when tested by manually tearing and pulling the respective samples.

EXAMPLE III

This example is also set forth as a control to illustrate the poorer tensile strength of polyethylene foams that contain no reinforcing fibers.

100 parts of granular high density polyethylene with a density of 0.96 and a melting range of 127–132- C. (260–270° F.) is fed into an extruder wherein a trichlorofluoromethane foaming agent is directly injected into the molten polyethylene according to the process outlined in U.S. Patent 3,160,688 under the following conditions:

| | °F. |
|---|---|
| Zone 1 | 302 |
| Zone 2 | 302 |
| Zone 3 | 266 |
| Die | 248 |

The resulting unreinforced foam, which has a thickness of about 0.1 inch and a density of from 2 to 4 lbs./cu. ft., is then compared to the reinforced foam of the next example.

The following Examples IV to VI illustrate the superior physical properties that are achieved when using reinforced foams.

EXAMPLE IV 80 parts of a granular high density polyethylene with a density of 0.96 and a melting range of 127–132° C. (260–270° F.) are dry blended with 20 parts of crystalline polypropylene having a melting point of about 176° C. (350° F.).

The dry blend is fed into a 1½ inch two-stage extruder with a 3/1 compression ratio at the following temperatures:

| | °F. |
|---|---|
| Zone 1 | 400 |
| Zone 2 | 450 |
| Zone 3 | 450 |
| Die | 450 |

The rate of extrusion is 37 lbs./hr. at 120 r.p.m. The composite monofilament obtained is pelletized as in Example II. The pellets are fed into an extruder wherein the polyethylene phase is foamed according to the extrusion process outlined in U.S. Patent 3,160,688 under the following conditions:

| | °F. |
|---|---|
| Zone 1 | 302 |
| Zone 2 | 302 |
| Zone 3 | 266 |
| Die | 248 |

In this example, the screens are removed from the extruder and the trichlorofluoromethane foaming agent is directly injected into the molten polyethylene in the barrel of the extruder.

The resulting polyethylene foam which has a thickness of about 0.1 inch and a density of from 2 to 4 lbs./cu. ft., is reinforced by dispersed polypropylene fibers and is found to have a greater tear and tensile strength than the unreinforced foam of Example III, when the foams are tested manually by tearing and pulling.

EXAMPLE V 95 parts of a granular low pressure polyethylene with a density of 0.950 and a melting range of 127–132° C. are dry blended with 5 parts of granular poly(4-methyl-1 pentene) with a melting point of about 235° C. (455° F.). The material is extruded into a ⅛ inch diameter rod in a 3 zone extruder having the following temperatures:

| | °F. |
|---|---|
| Zone 1 | 338 |
| Zone 2 | 482 |
| Zone 3 | 500 |
| Die | 500 |

The composite monofilament is hot drawn, cooled and pelletized as in Example II and then formed into a reinforced foam sheet according to the procedure set forth in Example IV except that die temperature is dropped to 100° C.

The resulting polyethylene foam, which has a thickness of about 0.1 inch and a density of from 2 to 4 lbs./cu. ft. is reinforced by randomly distributed poly(4-methyl-1-pentene) fibers and has a greater tear and tensile strength than the unreinforced foam of Example III when tested manually by tearing and pulling.

EXAMPLE VI

This example illustrates a method of reinforcing a copolymer foam. 90 parts of styrene/acrylonitrile copolymer (in the form of ¼ inch pellets) having a Staudinger molecular weight of about 50,000 and containing about 75% styrene by weight are blended with 10 parts of poly-(4-methyl-1-pentene) having a melting point of about 235° C. (455° F.). This mixture is extruded into a composite monofilament according to the procedures set forth in Example II. The pelletized material is steeped for 7 days in methylene chloride and foamed according to the procedure of Example I. The resulting reinforced foam which has a thickness of about 0.1 inch and density of from 2 to 4 lbs./cu. ft., is found to be comparable in tear strength to the foam produced in Example II and considerably stronger than the unreinforced foam of Example I.

In general any foamable thermoplastic resin may be reinforced in accordance with the teaching of this invention.

Examples of foamable thermoplastic resins which may be employed in the practice of this invention include amorphous polymers of the lower alpha olefins from 2 to 8 carbons, e.g., polyethylene, polypropylene, polybutene-1, polypentene-1 and their halogen and aliphatic substituted derivatives as represented by polyvinyl chloride, polyvinylidene chloride, etc.; polymers prepared from alkenyl aromatic monomers of the general formula:

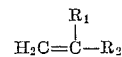

wherein $R_1$ is hydrogen, chlorine or methyl and $R_2$ is an aromatic radical of 6 to 10 carbon atoms which may also contain substituents such as halogens and alkyl groups attached to the aromatic nucleus, e.g., poly(styrene), poly(alpha-methylstyrene), poly(vinyl toluene), poly(alpha-chlorostyrene), poly(ortho-chlorostyrene), poly-(para-chlorostyrene), poly(meta-chlorostyrene), poly-(ortho-methyl styrene), poly(para-methylstyrene), poly-(ethyl-styrene), poly(isopropyl styrene), poly(dichlorostyrene), poly(vinylnaphthalene), etc.

One might also use copolymers of the foregoing alkenyl aromatic monomers and at least one copolymerizable vinylidene monomer. Preferred comonomers are those corresponding to the general formula:

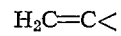

Examples of these vinylidene monomers would include acrylonitrile, methacrylonitrile, vinyl halides, alkyl acrylates, and alkylmethacrylates, wherein the alkyl group contains from 1 to 12 carbon atoms; dialkyl maleates, dialkyl fumarates; conjugated dienes such as butadiene; vinyl esters of carboxylic acids such as vinyl acetate, vinyl propionate, vinyl butyrate, vinyl benzoate; vinyl ethers such as vinyl methyl ether, vinyl isobutyl ethers and other vinylidene monomers such as are known to those skilled in the art.

Equally useful in the practice of this invention would be polymers and copolymers which contain a synthetic or natural rubber component such as butadiene, neoprene, nitrile rubbers, polyisoprene, polyisobutylene, natural rubbers, acrylonitrile/butadiene/styrene terpolymers, etc. These would include polyblends, graft copolymers and physical admixtures of a rubbery component with a rigid or semi-rigid component as well as the direct copolymerization of the rubbery monomer with the other monomers. These copolymer compositions are well known to those skilled in the polymer art and need no further explanation here.

Another group of foamable thermoplastic resins suitable for the practice of this invention would include polyvinyl esters prepared from monomers of the general formula:

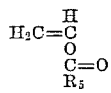

wherein $R_5$ is selected from the group comprising hydrogen, alkyl groups of from 1 to 10 carbon atoms, aryl groups of from 6 to 10 carbon atoms including the carbon atoms in ring substituted alkyl substituents; e.g., poly(vinyl formate), poly(vinyl acetate), poly(vinyl propionate), poly(vinyl benzoate) and the like.

Similar to the foregoing and equally useful are the vinyl ether type polymers prepared from monomers of the general formula:

wherein $R_6$ is an alkyl group of from 1 to 8 carbons, an aryl group of from 6 to 10 carbons, or a monovalent aliphatic radical of from 2 to 10 carbon atoms, which aliphatic radical may be hydrocarbon or oxygen containing, i.e., an aliphatic radical with ether linkages, and may also contain other substituents such as halogen, carbonyl, etc.

Examples of these polyvinyl ethers include poly(vinyl methyl ether), poly(vinyl ethyl ether), poly(vinyl n-butyl ether), poly(vinyl 2-chloroethyl ether), poly(vinyl phenyl ether), poly(vinyl isobutyl ether), poly(vinyl cyclohexyl ether), poly(p-butylcyclohexyl ether), poly(vinyl ether of p-chlorophenyl glycol), etc.

Other thermoplastic resins which may be used in the practice of this invention include cellulose ethers and esters, e.g., ethyl cellulose, cellulose acetate, cellulose acetate-butyrate; polyformaldehyde, polyacetals, etc. Especially preferred for the foamable resin are those resins excluding crystalline polypropylene and crystalline poly(4-methyl-1-pentene).

The practice of this invention contemplates the use of a foamable phase which is a copolymer, i.e., the polymeric product of two or more different monomers, as well as the use of a homopolymer foamable phase. As stated above, the concept of this invention includes polyblends, graft copolymers and physical admixtures of polymers as well as copolymers prepared by the direct polymerization of two or more monomers for use as the foamable phase.

The fibrous phase must be selected so as to provide a second component which will reinorce and strengthen the foamed phase. The reinforcing effect can be explained by two mechanisms. When the fibrous phase is stronger and of higher modulus than the foamed phase, the fibrous phase will bear a significant portion of the load placed on the fiber-reinforced foam thereby increasing the strength of the foam. Secondly, the tear strength of the foam is improved by virtue of the redistribution of the stress and the stopping of a tear when its tip encounters a transverse fiber. Likewise, the stress concentration at the tip of a microscopic crack which is capable of propagating through the foam becomes substantially dissipated when it encounters a fiber which redistributes the stress and stops further propagation of the crack.

In general, for either mechanism to operate effectively, the fibrous phase must have a greater toughness than the foamed phase, i.e., the fibrous phase must absorb a greater amount of energy prior to failure than an equal volume of the foamed phase.

The organic fibers are molecularly oriented by drawing the composite monofilament and/or by the viscous flow forces in or at the exit of the foaming extruder.

To achieve this reinforcing effect the fibers should have a length/diameter ratio ($L/D$) of at least 20 and up to 10,000, adequate adhesion to the foamed phase and a random distribution throughout the foamed phase. These fibers may be up to ½ inch in length and comprise up to 40% by weight of the reinforced foam.

The adhesion of the crystalline polyolefin fibers to the foam matrix may be improved by grafting short polymer chains onto the fibers. The grafted chain preferably has a composition similar to that of the foamed phase used.

In order to preserve the particulate fibrous structure and to obtain a random distribution of fibers throughout the foam, the material passing into the die should have a temperature below the midpoint of the melting range of the fibrous phase and preferably at least 5° F. below the minimum of the melting range of the fibrous phase.

In addition to the above, the foamable phase should exhibit a preferential absorption of the pneumatogen or foaming agent, whereas the fibrous phase should absorb little or no pneumatogen. This preferential absorption can be controlled in a manner known to those skilled in the art by selecting a pneumatogen or foaming agent which is a better solvent for the foamable phase than for the fibrous phase by balancing the polar nature of the pneumatogen and foamable phase. If the fibrous phase is crystalline, this can effectively limit the solubility and absorption of pneumatogen. This preferential absorption may also be brought about in part by the fact that diffusion of the pneumatogen into the preformed fibrous phase is considerably slower than the diffusion into the foamable phase.

In general crystalline polyolefins and mixtures thereof are the preferred materials for use in the fibrous phase. Especially preferred are crystalline polypropylene and crystalline poly(4-methyl-1-pentene).

The composite monofilament of foamable thermoplastic resin containing the pre-formed fibers may be extruded, drawn and pelletized according to any of the conventional means for producing composite monofilaments, such as those described in U.S. Patents 3,097,991 and 3,099,067 and British Patent 930,074.

The foaming of the thermoplastic polymer may be accomplished by any of the conventional methods which are currently used to prepare low density foamed thermoplastic resins. These include such diverse methods as extruding thermoplastic beads or pellets which contain pneumatogens, e.g., Platzer, U.S. Patent 3,072,581; extrusion of thermoplastic wherein the pneumatogen is injected directly into the extrusion barrel such as is taught in Aykanian et al. U.S. Patent 3,160,688; and extrusion of thermoplastic resins containing a chemical blowing agent which decomposes at extrusion temperatures to foam the resin.

Other methods include foaming the resin in a mold by introducing the thermoplastic polymer into a mold along with any pneumatogens or chemical blowing agents and subjecting the same to heat and/or pressure to form the foamed polymer.

A one-step process is also contemplated using a combination "pre-form" and foaming extruder which has two temperature zones. The first zone is a high temperature extruder zone in which the fiber-forming phase is molten and can be elongated into fibers. The molten composite is immediately led into the second zone or foaming extruder which is cooler than the first zone, where the fibrous phase solidifies without solidification of the foamable phase. The solidification and pelletizing of the composite monofilament described in Example II is thus eliminated.

The second or foaming extruder zone is maintained at a temperature which is below the midpoint of the melting range of the fibrous phase in order to solidify the fibers. Molecular orientation of the fibers in this case occurs due to the shear and extension forces on the solidified fibers in the foaming extruder. The same results can be obtained in a sufficiently long extruder with the front stages run cooler. In both cases the pneumatogen would be injected into the cooler zone of the barrel as previously described.

These and other methods should be familiar to those skilled in the art of preparing foamed thermoplastic resins and need not be described further here.

Also contemplated within the scope of this invention is the use of such materials as pigments, dyes, stabilizers, nucleating agents, fillers, plasticizers, etc.

It is apparent that many variations may be made in the products and processes of this invention without departing from the spirit and scope thereof.

What is claimed is:

1. A foamed thermoplastic resin reinforced with fibers, wherein the fibrous component is selected from the group consisting of crystalline polypropylene and crystalline poly(4-methyl-1-pentene) fibers which are substantially tougher and stronger than the foamed phase with the proviso that the foamed thermoplastic resin is not crystalline polypropylene or crystalline poly(4 - methyl - 1-pentene); wherein the reinforced resin is produced by a process comprising:
    (A) blending the thermoplastic resin to be foamed with a fiber-forming component selected from the group consisting of crystalline polypropylene and crystalline poly(4-methyl-1-pentene),
    (B) heating the blend in an extruder to form a melt of the two resins,
    (C) extruding the melt through a die orifice thereby forming a composite monofilament having fibers selected from the group consisting of crystalline polypropylene and crystalline poly(4-methyl-1-pentene) fibers within a matrix of foamable thermoplastic resin,
    (D) drawing the composite monofilament,
    (E) pelletizing the drawn composite monofilament and then
    (F) foaming the foamable thermoplastic resin.

2. A composition as in claim 1 wherein the foamed phase is an alkyl aromatic polymer.

3. A composition as in claim 2 wherein the foamed phase is polystyrene and the fibrous phase is crystalline polypropylene.

4. A composition as in claim 2 wherein the foamed phase is polystyrene and the fibrous phase is crystalline poly(4-methyl-1-pentene).

5. A composition as in claim 1 wherein the foamed phase is polyethylene and the fibrous phase is crystalline polypropylene.

6. A composition as in claim 1 wherein the foamed phase is a polyethylene and the fibrous phase is crystalline poly (4-methyl-1-pentene).

7. A process for the production of a foamed thermoplastic resin reinforced with fibers, wherein the fibrous component is selected from the group consisting of crystalline polypropylene and crystalline poly(4 - methyl - 1-pentene) fibers which are substantially tougher and stronger than the foamed phase with the proviso that the foamed thermoplastic resin is not crystalline polypropylene or crystalline poly(4-methyl-1-pentene); said process comprising:
    (A) blending the thermoplastic resin to be foamed with a fiber-forming component selected from the group consisting of crystalline polypropylene and crystalline poly(4-methyl-1-pentene),
    (B) heating the blend in an extruder to form a melt of the two resins,
    (C) extruding the melt through a die orifice thereby forming a composite monofilament having fibers selected from the group consisting of crystalline polypropylene and crystalline poly(4-methyl-1-pentene) within a matrix of foamable thermoplastic resin,
    (D) drawing the composite monofilament,
    (E) pelletizing the drawn composite monofilament and then
    (F) foaming the foamable thermoplastic resin.

8. A process as in claim 7 wherein the foamed phase is an alkyl aromatic resin.

9. A process as in claim 8 wherein the foamed phase is polystyrene and the fiber forming material is crystalline polypropylene.

10. A process as in claim 8 wherein the foamed phase is polystyrene and the fibrous phase is crystalline poly (4-methyl-1-pentene).

11. A process as in claim 7 wherein the foamed phase is polyethylene and the fiberous phase is crystalline polypropylene.

12. A process as in claim 8 wherein the foamed phase is polyethylene and the fibrous phase crystalline is poly (4-methyl-1-pentene).

References Cited

UNITED STATES PATENTS

| | | |
|---|---|---|
| 2,880,057 | 1/1958 | Cuculo. |
| 3,062,682 | 11/1962 | Morgan et al. |
| 3,345,442 | 10/1967 | Oxel _____ 260—2.5 |

MURRAY TILLMAN, Primary Examiner

M. FOELAK, Assistant Examiner

U.S. Cl. X.R.

260—4, 17, 41, 41.5, 889, 897; 264—47, 53, 174